Patented Jan. 18, 1949

2,459,435

UNITED STATES PATENT OFFICE 2,459,435

SUBSTANTIVE TRIAZINE AZO DYES

Ernst Keller and Reinhard Zweidler, Basel, Switzerland, assignors to J. R. Geigy A. G., Basel, Switzerland, a Swiss firm No Drawing. Application August 28, 1944, Serial No. 551,622. In Switzerland September 1, 1943

10 Claims. (Cl. 260—153)

We have found that valuable new compounds of the stilbene or dibenzyl series respectively are obtained, when condensation products of the general formula

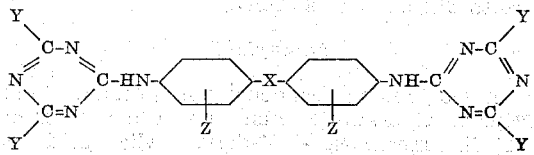

wherein

X means —CH=CH—, —CH$_2$—CH$_2$—,
Y represents halogen and
Z means H, —COOH or —SO$_3$H, are caused to react with aromatic amines with the condition that at least one halogen atom is replaced by the radical of an aminoazo compound or of an amine capable of forming azo dyestuffs and that the other halogen atoms are replaced by inorganic or organic radicals, which may also contain azo groups, or partly by inorganic and partly by organic radicals. If several organic radicals are present, the said radicals may be the same or different ones. Among the radicals of amines which are capable of forming azo dyestuffs are those which contain a further diazotisable amino group or a group, which eventually can be converted into such a group by saponification or reduction, or substituents enabling the coupling with suitable diazo components. In this case the coupling may be carried out in substance or on the fibre. Of course, the amines or aminoazo compounds, which must be introduced into the condensation product of the above described general formula, must contain no groupings suitable for metallisation on the fibre or in substance.

The new dyestuffs obtainable according to this invention are direct cellulosic dyestuffs which, in general, are distinguished by a good drawing power and by a good fastness to water and to washing even by direct dyeing. Surprisingly in the most cases fastness to water and to washing are considerably improved by an after-treatment with a little quantity of formaldehyde.

According to the condensation components used in accordance with the invention, which offers numerous possibilities of variation, dyestuffs can be produced which dye cellulosic fibres especially in yellow, orange, red, violet and brown shades and which are suitable for diazotation and coupling, for coupling with diazotised amines, for the after-treatment with formaldehyde. Thus, different types of after-treatment dyestuffs can be prepared, whose after-treated dyeings are distinguished by good to very good fastness properties in the moist state. Finally, there may be stated that especially the dyestuffs suitable for after-treatment with formaldehyde show the valuable properties that they do not tint animal fibres to any considerable extent so that, in combination with suitable wool dyestuffs, the said dyestuffs are very valuable for dyeing mixtures and mixed fabrics from cellulosic fibres and animal fibres.

The following examples and tables will illustrate the invention; of course, the invention is not to be limited to these examples and tables, wherein the parts are by weight.

Example 1

37 parts of cyanuric chloride in form of a fine aqueous suspension are caused to react in a neutral reaction medium with a neutral solution of 37 parts of 4:4'-diamino stilbene-2:2'-disulfonic acid at 0°–4° C. The diprimary condensation product is further condensed at 40°–42° C. with a neutral solution of 55.4 parts of 4-amino - 1:1'-azobenzene-3'-sulfonic acid, the reaction being maintained in a neutral condition by addition of sodium carbonate. Subsequently the ditertiary condensation product is produced by interaction at 85°–95° C. with an excess of dimethylamine and finally isolated by precipitation with sodium chloride.

The dried dyestuff constitutes a yellow powder dissolving in water with a yellow coloration and dyeing cellulosic fibres in yellow shades of good light-fastness. By an after-treatment with formaldehyde on the fibre the fastness properties in the moist state are considerably improved.

Example 2

37 parts of cyanuric chloride are interacted with 37 parts of 4:4'-diaminostilbene-2:2'-disulfonic acid thus giving the diprimary condensation product. Both the remaining halogen atoms are exchanged in the known manner by 92.8 parts of the monoazo dyestuff obtainable from diazotised 2-aminonaphthalene-4:8-disulfonic acid and 1-amino-3-acetaminobenzene. The ditertiary condensation product is produced by causing the obtained product to react on the boiling water-bath with 25.8 parts of aniline hydrochloride and with 60 parts of crystallised sodium acetate.

The dried dyestuff is an orange colored powder dissolving in water with an orange coloration and dyeing cellulosic fibres in reddish yellow shades of good fastness properties in the moist state and of good light-fastness. By an after-treatment with formaldehyde the fastness in the moist state can still further be improved.

Example 3

The condensation product from 37 parts of cyanuric chloride and 37 parts of 4:4'-diaminostilbene-2:2'-disulfonic acid is caused to react in the usual way with 54.2 parts of 4-amino-3-methoxy-1:1'-azobenzene-3'-carboxylic acid. The ditertiary condensation product is obtained by a further condensation at 85°-95° C. with 30 parts of 3-acetamino-1-aminobenzene in the presence of 30 parts of crystallised sodium acetate.

The dyestuff thus obtained is a brown powder dissolving in water with a yellow coloration and dyeing cellulosic fibres in yellow shades of good fastness properties in the moist state which, by an after-treatment with formaldehyde, can still be improved.

If the acetyl groups of the dyestuff are saponified for instance by boiling the dyestuff for 1 hour with a 5% caustic soda lye, a product is obtained whose dyeings can be diazotised and developed. Thus, for example with phenyl methyl pyrazolone, yellow shades of good fastness to water and washing are obtained.

Example 4

The condensation product obtainable from 37 parts of cyanuric chloride and 37 parts of 4-4'-diaminostilbene-2:2'-disulfonic acid is further condensed with 124.2 parts of the monoazo dyestuff obtainable from 1-diazo-8-(p-toluene sulfo)-hydroxynaphthalene-3:6-disulfonic acid and 1-amino-3-methyl-6-methoxybenzene. Both the remaining chlorine atoms are caused to react with 25.8 parts of aniline hydrochloride and with 60 parts of crystallised sodium acetate. The ditertiary condensation product is salted out, then the p-toluene sulfo group is split off in an alkaline solution and the dyestuff is isolated.

The dried dyestuff is a dark red powder dissolving in water with a red coloration and dyeing cellulosic fibres in red shades. By an after-treatment with formaldehyde one obtains dyeings of good fastness properties to water and to washing.

Example 5

To a fine suspension of 21 parts of 4:4'-diaminostilbene and of 37 parts of cyanuric chloride in water are slowly added at 0°-4° C. 10.6 parts of sodium carbonate. After completion of the reaction the mixture is further condensed with 124.1 parts of the monoazo dyestuff obtainable from 1-diazo-8-(p-toluene sulfo)-hydroxynaphthalene-3:6-disulfonic acid and 1-amino-3-methyl-6-methoxybenzene. The ditertiary condensation product is obtained by inter-action with 25.8 parts of aniline hydrochloride and 60 parts of crystalline sodium acetate.

The dried dyestuff is a red powder dissolving in water with a red coloration and dyeing cellulosic fibres in red shades of good fastness properties to water, washing and to light. By an after-treatment with formaldehyde the fastness properties in the moist state are still improved.

Example 6

If the disecondary condensation product obtainable as described in Example 4 from two moles of cyanuric chloride, 1 mole of 4:4'-diaminostilbene-2:2'-disulfonic acid and 2 moles of the monoazo dyestuff from 1-diazo-8-(p-toluene sulfo)-hydroxynaphthalene-3:6-dissulfonic acid and 1-amino-3-methyl-6-methoxybenzene is condensed in the third stage with 2 moles of 3-aminoacetanilide and saponified, there will be obtained a dyestuff with similar properties. This dyestuff can, moreover, be diazotised and developed on the fibre; thus, when after-treating for example with β-naphthol, highly yellowish red shades of good fastness properties to water and to washing are obtained.

Example 7

The diprimary condensation product from 37 parts of cyanuric chloride and 29.8 parts of 4:4'-diaminostilbene-3:3'-dicarboxylic acid is caused to react in the usual manner with 73.9 parts of 4-amino-2-acetamino-1:1'-azobenzene-4'-chlorosulfonic acid-(3') to give the disecondary condensation product which is further condensed with 25.8 parts of aniline hydrochloride and with 60 parts of crystallised sodium acetate.

The dried dyestuff is a yellowish red powder dissolving in water with a yellowish orange coloration and dyeing cellulosic fibres in reddish yellow shades of good fastness to light, washing and to water. By an after-treatment with formaldehyde the fastness properties in the moist state can still be improved.

Example 8

By condensing 37 parts of cyanuric chloride in the usual way with 37 parts of 4:4'-diaminostilbene-2:2'-disulfonic acid, transforming this condensation product with 73.9 parts of 4-amino-2-acetamino-1:1'-azobenzene-4'-chloro-3'-sulfonic acid into the disecondary condensation product and by further condensing with 28.5 parts of 1-chloro-2:4-diaminobenzene a dyestuff is obtained which dissolves in water with an orange yellow coloration. It dyes cellulosic fibres in reddish-yellow shades, can be diazotised on the fibre and yields, when developed with phenyl methyl pyrazolone, reddish-yellow dyeings of good washing- and water-fastness.

Example 9

When 37 parts of cyanuric chloride are condensed with 37 parts of 4:4'-diaminostilbene disulfonic acid and subsequently with 47.8 parts of 2-amino-5-hydroxynaphthalene-7-sulfonic acid and when both the tertiary chlorine atoms are interacted with 25.8 parts of aniline hydrochloride and with 60 parts of crystalline sodium acetate, a bright grey substance is obtained.

The condensation product can be applied to cellulosic fibres according to the usual dyeing methods and be developed with diazotised p-nitraniline or with other diazo compounds. Thus orange to red shades of good fastness properties in the moist state are obtained.

*Example 10*

37 parts of cyanuric chloride and 37 parts of 4:4'-diaminostilbene-2:2'-disulfonic acid are interacted in the usual manner to give the diprimary condensation product. Then the product is condensed with 89.4 parts of the disazo dyestuff obtainable in a known manner from diazotised 4-amino-1:1'-azobenzene and 2-amino-5-hydroxynaphthalene-7-sulfonic acid and finally the ditertiary condensation product is produced by interaction with 34.6 parts of metanilic acid.

The dried dyestuff is a dark red powder dissolving in water with a red coloration and dyeing cellulosic fibres in bluish-red shades which, when aftertreated with formaldehyde, possess improved fastness properties to washing.

*Example 11*

The condensation product obtainable analogously to Example 10 from 2 moles of cyanuric chloride, 1 mole of 4:4'-diaminostilbene-2:2'-disulfonic acid, 2 moles of 2-amino-5-hydroxynaphthalene-7-sulfonic acid and 2 moles of aniline is coupled with diazotised 4-amino-1:1'-azobenzene in a slightly alkaline solution.

The dried dyestuff is a dark red powder which dissolves in water with a red coloration and which dyes cellulosic fibres in bluish-red shades. By an aftertreatment with formaldehyde the fastness properties in the moist state may still be improved.

*Example 12*

The condensation product from 37 parts of cyanuric chloride and 37 parts of 4:4'-diaminostilbene-2:2'-disulfonic acid is condensed in a known manner with 75.6 parts of 4-amino-2-methyl-6-methoxy-4'-acetamino-1:1'-azobenzene-5'-sulfonic acid thus giving the disecondary condensation product. The remaining chlorine atoms are caused to react with 25.8 parts of aniline hydrochloride and with 60 parts of crystalline sodium acetate and the acetyl group is saponified in an alkaline solution, for instance as described in Example 3.

The dried dyestuff is a yellowish-orange powder, soluble in water with an orange coloration and dyeing cellulosic fibres in yellowish-orange shades. By diazotation and coupling with phenyl methyl pyrazolone deep orange dyeings of good fastness properties in the moist state are obtained.

*Example 13*

37 parts of cyanuric chloride and 37 parts of 4:4'-diaminostilbene-2:2'-disulfonic acid are condensed in the usual manner and the diprimary condensation product is caused to react with 62.1 parts of the monoazo dyestuff obtainable from 1-diazo-8-(p-toluene sulfo)-hydroxynaphthalene-3:6-disulfonic acid and 1-amino-3-methyl-6-methoxybenzene. The remaining chlorine atoms are interacted with 38.7 parts of aniline hydrochloride and with 90 parts of crystallised sodium acetate. After having split off the toluene sulfo group the dyestuff is obtained in form of a dark red powder. It dissolves in water with a red coloration and dyes cellulosic fibres in red shades of good fastness properties in the moist state, which properties can further be improved by a treatment with formaldehyde.

A similar product may be obtained for instance, if the diprimary condensation product is brought to interaction first with 12.9 parts of aniline hydrochloride and 30 parts of crystallised sodium acetate, then with the above described monoazo dyestuff and finally further condensed with 28.6 parts of monomethylaniline hydrochloride and 60 parts of crystallised sodium acetate.

*Example 14*

The diprimary condensation product from 37 parts of cyanuric chloride and 37 parts of 4:4'-diaminostilbene-2:2'-disulfonic acid is first condensed with 84.2 parts of the monoazo dyestuff obtainable from diazotised 2-naphthylamine-4:8-disulfonic acid and m-toluidine and then with 38.7 parts of aniline hydrochloride and with 90 parts of crystallised sodium acetate. The dried dyestuff is a brown powder dissolving in water with a yellow coloration and dyeing cellulosic fibres in yellow shades of good fastness to washing and to water. The fastness properties in the moist state can still further be improved by an after-treatment with formaldehyde.

*Example 15*

37 parts of cyanuric chloride and 37 parts of 4:4'-diaminostilbene-2:2'-disulfonic acid are condensed thus producing the diprimary condensation product. Then this is further condensed with 35.8 parts of 3'-aminobenzoyl-2-amino-5-naphthol-7-sulfonic acid. When the interaction has completed the remaining halogen atoms are replaced by the 1:3-diamino-4-chlorobenzene radical. After isolation and drying a bright powder is obtained. By coupling of the latter with 27.8 parts of diazotised 4-amino-1:1'-azobenzene-4'-sulfonic acid in a known manner a dyestuff is produced which dyes cellulosic fibres in red shades and which, when diazotised on the fibres and after-treated with β-naphthol, gives full red dyeings of good fastness to washing and to water.

The same dyestuff may also be obtained, when, in the second stage, the condensation is first effected with the disazo dyestuff obtainable from diazotised 4-amino-1:1'-azobenzene-4'-sulfonic acid and from 3'-aminobenzoyl-2-amino-5-naphthol-7-sulfonic acid and subsequently with 1:3-diamino-4-chlorobenzene in order to produce the ditertiary condensation product.

The following tables contain further dyestuffs obtainable according to this invention. In these tables only the compounds corresponding to the components A and B of the dyestuffs having the general formula

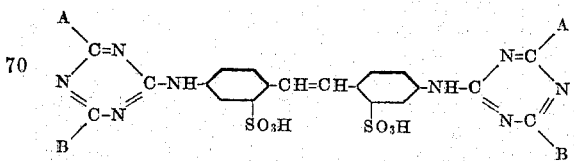

are indicated.

Table I

[In the last column the after-treatment methods coming into question are enumerated.]

| No. | compound A | compound B | dyeing on cellulosic fibres | possibility of after-treatment |
|---|---|---|---|---|
| 1 | 4-amino-1:1'-azobenzene-3'-sulfonic acid | aniline | yellow | Formaldehyde. |
| 2 | 4-amino-2-methyl-5-methoxy-1:1'-azobenzene-4'-sulfonic acid. | do | do | Do. |
| 3 | 4-amino-3-methoxy-1:1'-azobenzene-3'-carboxylic acid. | do | greenish-yellow | Do. |
| 4 | 4-amino-2-acetamino-1:1'-azobenzene-4'-chloro-3'-sulfonic acid. | do | yellow | Do. |
| 5 | 4-amino-2-acetamino-1:1'-azobenzene-4'-chloro-3'-sulfonic acid. | ammonia | do | Do. |
| 6 | 4-amino-2-acetamino-1:1'-azobenzene-4'-chloro-3'-sulfonic acid. | dimethylamine | do | Do. |
| 7 | 4-amino-2-acetamino-1:1'-azobenzol-4'-chloro-3'-sulfonic acid. | 3-aminoacetanilide | do | Do. |
| 8 | 2-naphthylamine-4:8-disulfonic acid ⟶ 3-aminoacetanilide. | do | reddish-yellow | Do. |
| 9 | do | ammonia | do | Do. |
| 10 | do | dimethylamine | do | Do. |
| 11 | do | aniline | do | Do. |
| 12 | dyestuff from diazotised p-toluenesulfoester of the 1:8-amino-naphthol-3:6-disulfonic acid and 1-amino-2-methoxy-5-methyl-benzene, saponified. | monomethylaniline | red | Do. |
| 13 | do | dimethylamine | do | Do. |
| 14 | do | 1:4-diamino-benzene | do | Formaldehyde, develop with nitrite and β-naphthol. |

Table II

Dyestuffs of the general formula:

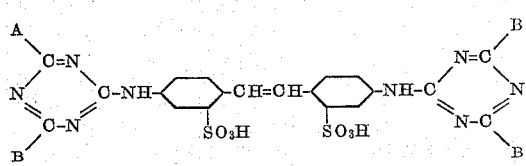

[In the last column the after-treatment methods coming into question are enumerated.]

| No. | compound A | compound B | dyeing on cellulosic fibres | possibility of after-treatment |
|---|---|---|---|---|
| 1 | 4-amino-5-methoxy-1:1'-azobenzene-3'-carboxylic acid. | dimethylamine | greenish-yellow | Formaldehyde. |
| 2 | do | aniline | do | Do. |
| 3 | do | 3-aminoacetanilide | do | Formaldehyde, saponified, develop with phenylmethyl-pyrazolone. |
| 4 | 2-naphthylamine-4:8-disulfonic acid ⟶ 3-aminoacetanilide. | 1-chloro-2:4-diaminobenzene. | reddish-yellow | Formaldehyde, develop with phenylmethyl-pyrazolone. |
| 5 | 4-amino-4'-acetamino-5-methoxy-2-methyl-1:1'-azobenzene-3'-sulfonic acid. | aniline | yellow | Formaldehyde, saponified, develop with phenylmethyl-pyrazolone. |
| 6 | 4-amino-2-acetamino-4'-chloro-1:1'-azobenzene-3'-sulfonic acid. | do | do | Formaldehyde. |

Table III

Dyestuffs of the general formula:

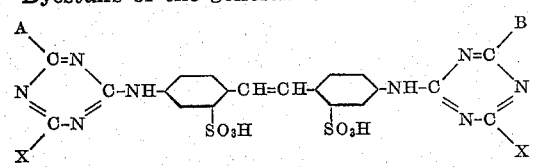

[In the last column the after-treatment methods coming into question are enumerated.]

| No. | compound A | compound B | compound X | dyeing on cellulosic fibres | possibility of after-treatment |
|---|---|---|---|---|---|
| 1 | dyestuff from diazotised p-toluenesulfo-ester of the 1:8-amino-naphthol-3:6-disulfonic acid and 1-amino-2-methoxy-5-methyl-benzene, saponified. | 4-amino-3-methoxy-1:1'-azo-benzene-3'-carboxylic-acid. | aniline | yellowish-red | Formaldehyde. |

Similar dyestuffs can be obtained, when the 4:4'-diaminostilbene-2:2'-disulfonic acid used in the above tables is replaced by 4:4'-diaminostilbene-2:2'-dicarboxylic acid, by 4:4'-diaminostilbene or by the corresponding dibenzyl derivatives.

What we claim is:
1. A process for the manufacture of a substantive dyestuff consisting in condensing a compound of the formula

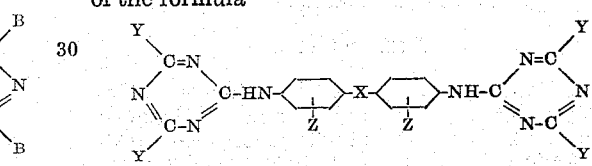

wherein X stands for a member selected from the group consisting of —CH=CH— and

—CH₂—CH₂— each Y stands for a halogen atom and each Z stands for a member selected from the group consisting of H, —COOH and —SO₃H, with amines which are free from groupings suitable for metallization and from enolisable keto groups, at least one of the said amines being selected from the group consisting of monoamino monoazo compounds of the benzene series, monoamino monoazo compounds of both the benzene and naphthalene series and monoamino disazo compounds of the benzene series.

2. A process for the manufacture of a substantive dyestuff consisting in condensing a compound of the formula

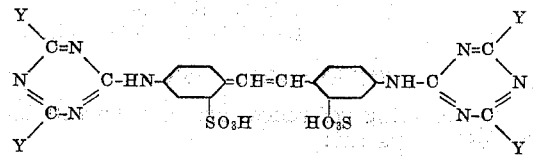

wherein each Y stands for a halogen atom, with amines which are free from groupings suitable for metallization and from enolisable keto groups, at least one of the said amines being selected from the group consisting of monoamino monoazo compounds of the benzene series, monoamino monoazo compounds of both the benzene and naphthalene series and monoamino disazo compounds of the benzene series.

3. A process for the manufacture of a substantive dyestuff, consisting in condensing a compound of the formula

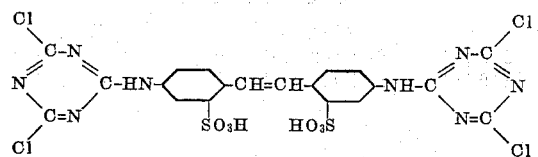

with the aminoazo dyestuff of the formula

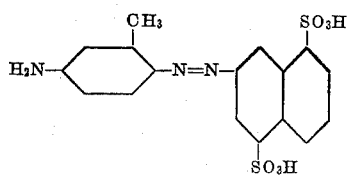

and with aniline.

4. A process for the manufacture of a substantive dyestuff, consisting in condensing a compound of the formula

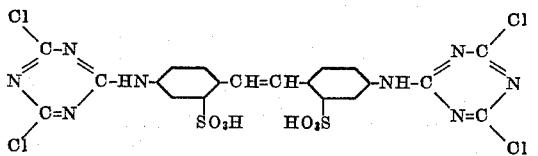

with the aminoazo dyestuff of the formula

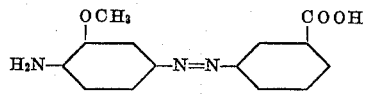

and with 3-acetylamino-1-aminobenzene.

5. A process for the manufacture of a substantive dyestuff, consisting in condensing a compound of the formula

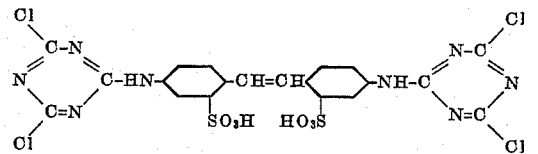

with the aminoazo dyestuff of the formula

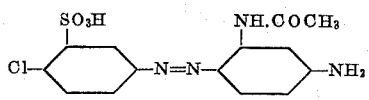

and with 1-chloro-2:4-diaminobenzene.

6. A substantive dyestuff of the formula

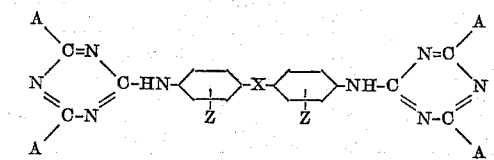

wherein X stands for a member selected from the group consisting of —CH=CH— and

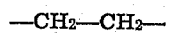

—CH₂—CH₂— each Z stands for a member selected from the group consisting of H, —COOH and —SO₃H, and each A stands for the radical of an amine which is free from groupings suitable for metallization and from enolisable keto groups, at least one of the said amines being selected from the group consisting of monoamino monoazo compounds of the benzene series, monoamino monoazo compounds of both the benzene and naphthalene series and monoamino disazo compounds of the benzene series.

7. A substantive dyestuff of the formula

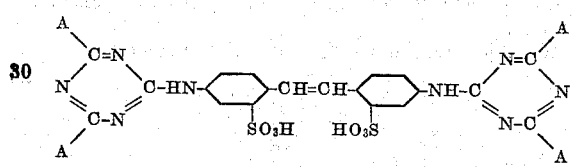

wherein each A stands for the radical of an amine which is free from groupings suitable for metallization and from enolisable keto groups, at least one of the said amines being selected from the group consisting of monoamino monoazo compounds of the benzene series, monoamino monoazo compounds of both the benzene and naphthalene series and monoamino disazo compounds of the benzene series.

8. The substantive dyestuff of the formula

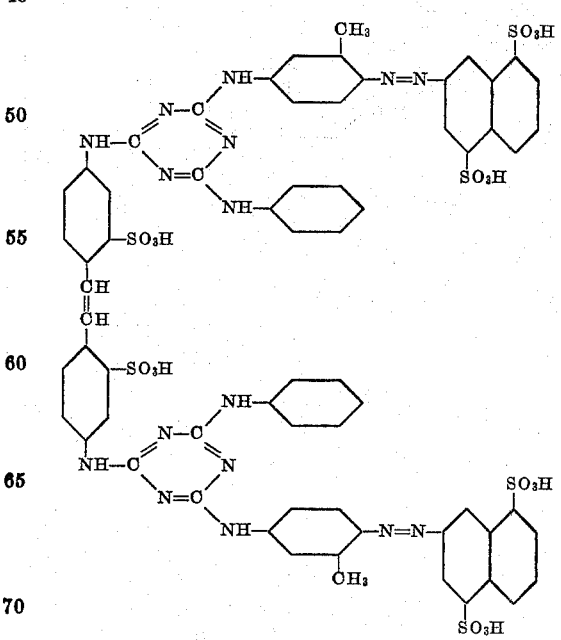

being a brown powder dissolving in water with yellow color and dyeing cellulosic fibres in yellow shades.

9. The substantive dyestuff of the formula

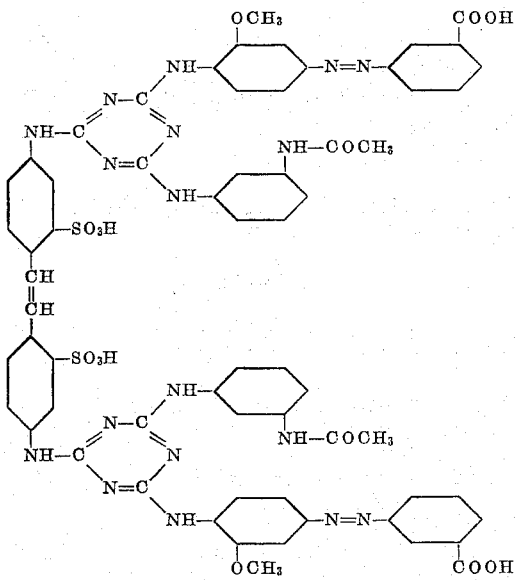

being a brown powder dissolving in water with yellow color and dyeing cellulosic fibres in yellow shades.

10. The substantive dyestuff of the formula

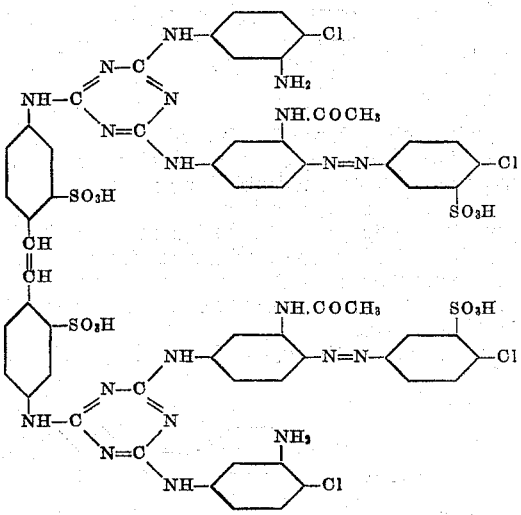

being a brown powder dissolving in water with orange yellow coloration and dyeing cellulosic fibres in reddish yellow shades.

ERNST KELLER.
REINHARD ZWEIDLER.

REFERENCES CITED

The following references are of record in the file of this patent:

UNITED STATES PATENTS

| Number | Name | Date |
|---|---|---|
| 2,004,250 | Schindhelm et al. | June 11, 1935 |
| 2,195,788 | Schmid | Apr. 2, 1940 |
| 2,221,360 | Schmid | Nov. 12, 1940 |
| 2,221,361 | Schmid | Nov. 12, 1940 |
| 2,221,362 | Schmid | Nov. 12, 1940 |
| 2,270,478 | Schmid | Jan. 20, 1942 |
| 2,283,261 | Kaiser | May 19, 1942 |
| 2,368,844 | Keller | Feb. 6, 1945 |
| 2,399,066 | Schmid et al. | Apr. 23, 1946 |

FOREIGN PATENTS

| Number | Country | Date |
|---|---|---|
| 110,626 | Switzerland | June 16, 1925 |
| 110,663 | Switzerland | June 16, 1925 |